J. L. HECHT.
METAL WHEEL.
APPLICATION FILED APR. 22, 1918.

1,299,464.

Patented Apr. 8, 1919.
2 SHEETS—SHEET 1.

Witnesses

Inventor
J L Hecht
By Rogers, Kennedy & Campbell
Attorney

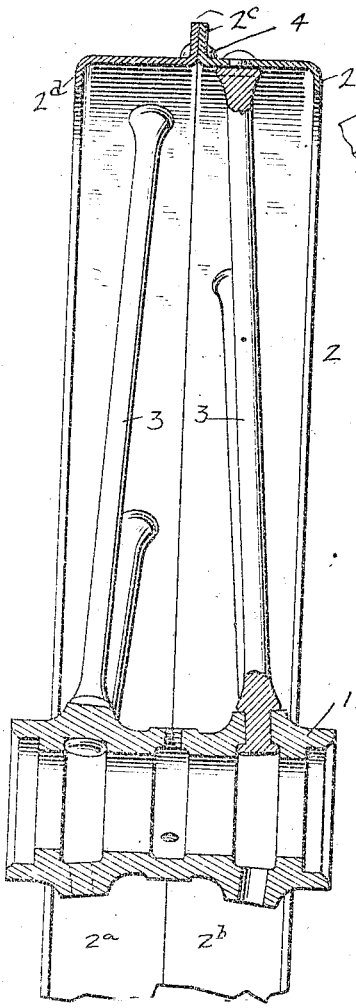
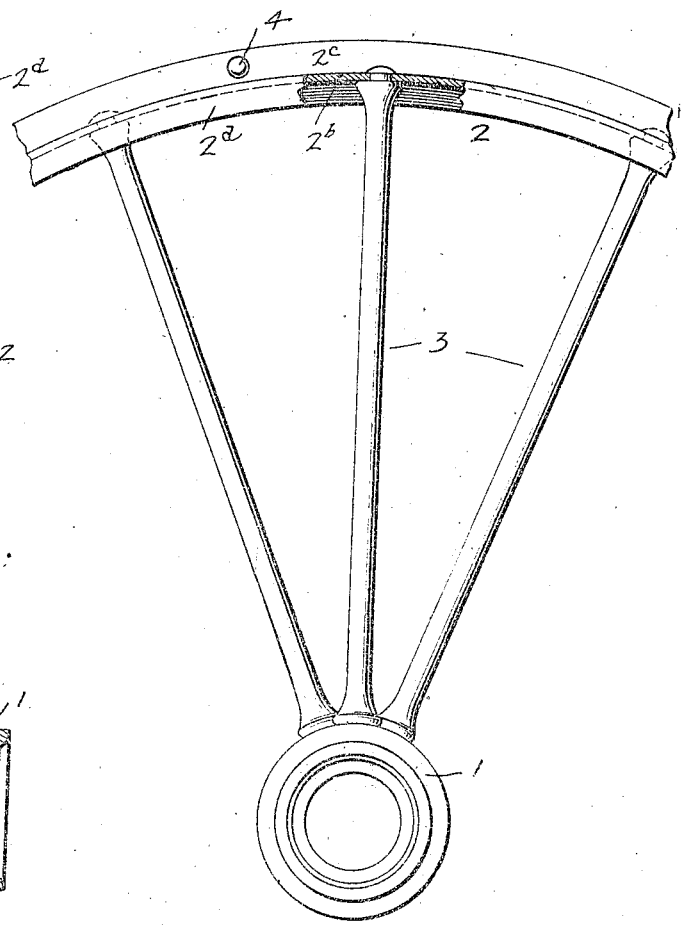

UNITED STATES PATENT OFFICE.

JOSEPH L. HECHT, OF DAVENPORT, IOWA, ASSIGNOR TO G. WATSON FRENCH, NATHANIEL FRENCH, JOSEPH L. HECHT, AND W. H. STACKHOUSE, ALL OF DAVENPORT, IOWA, COMPOSING THE FIRM OF FRENCH & HECHT.

METAL WHEEL.

1,299,464.  Specification of Letters Patent.  Patented Apr. 8, 1919.

Application filed April 22, 1918. Serial No. 229,950.

*To all whom it may concern:*

Be it known that I, JOSEPH L. HECHT, a citizen of the United States, residing at Davenport, in the county of Scott and State of Iowa, have invented certain new and useful Improvements in Metal Wheels, of which the following is a specification, reference being had therein to the accompanying drawing.

This invention relates to metal wheels and has reference more particularly to the rim thereof, the object of the invention being to produce a simple, strong and durable construction of rim in which an anti-skid member will be provided to prevent the skidding or sluing of the wheel. With this end in view the invention consists in forming the rim of two annular sections, each having an outwardly extending edge flange, which sections are disposed edgewise relatively to each other and have the edge flanges connected firmly together and thereby forming a rim with a circumferential anti-skid rib projecting outwardly from the tread portion of the same.

The invention consists also in forming the two annular sections which make up the rim, with inwardly extending flanges on their outer edges so that in the assembled relations of the sections in the rim, the latter will be provided with flanges at its outer edges which will serve to stiffen and strengthen the structure as a whole.

In the accompanying drawings:

Fig. 3 is a longitudinal sectional elevation on an enlarged scale through a portion of the wheel.

Fig. 4 is a side elevation of the same with a part of the rim broken away.

Figure 1:
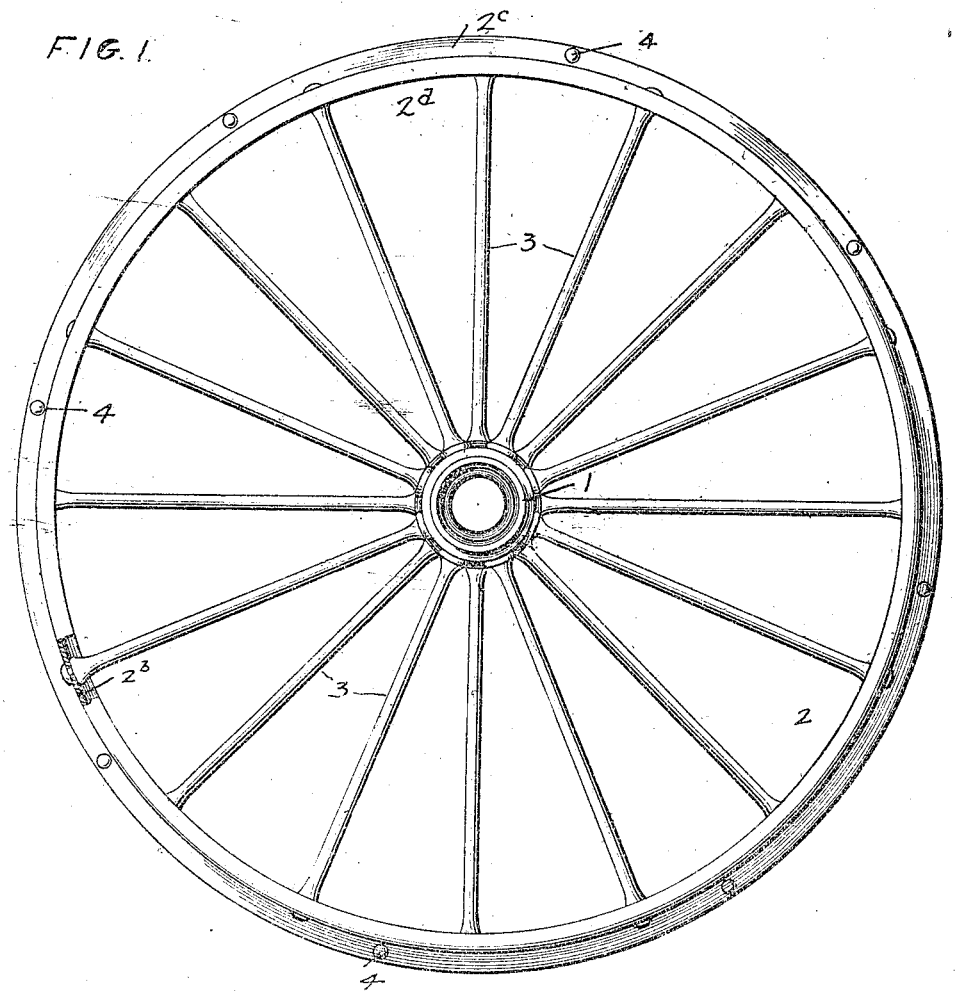
Figure 1 is a side elevation of a wheel having my invention embodied therein.

Referring to the drawings:

1 designates the hub of the wheel; 2 the rim; and 3 the spokes, which in the present instance are arranged in two rows or ranks and suitably connected at their ends to the rim and hub respectively.

The rim of the wheel, with which my invention is concerned, is constructed of two annular complementary connected sections 2$^a$ and 2$^b$ of such individual form that in their connected relations in the rim, a circumferential anti-skid member will be formed projecting outwardly from the tread portion, and circumferential strengthening members will be formed projecting inwardly from the outer edges of the rim.

Figure 2:
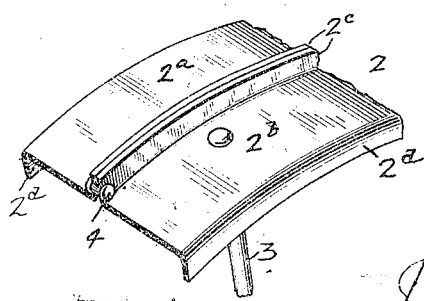
Fig. 2 is a fragmentary perspective view of a portion of the rim and of a connected spoke.

Each section of the rim, to produce this result, consists of a plate having at opposite edges oppositely extending edge flanges 2$^c$ and 2$^d$, as shown more particularly in Figs. 2 and 3. These flanged plates are given their proper circular or annular form and are disposed edgewise relatively to each other with the outwardly extending flanges abutting against each other and firmly connected flatly together, as for instance by the rivets 4. The connected flanges thus constitute in effect an anti-skid rib which extends circumferentially of the rim and projects from the tread portion thereof at its center, which rib in the use of the wheel, prevents the same from skidding or sluing. The edge flanges 2$^c$ and 2$^d$ on the outer edges of the rim project inwardly and form strengthening and stiffening members which gives the rim the necessary rigidity and strength.

The construction as a whole possesses the very desirable characteristics of simplicity and economy in production, and durability and effectiveness in operation, the anti-skid rib by being made up of two thicknesses of metal constituting a very strong and stiff member well adapted to withstand the severe conditions encountered in the use of the wheel, while at the same time, in connection with the inwardly projecting edge flanges on the outer edges of the rim, the structure as a whole is given great strength, durability and wearing qualities.

In the accompanying drawings and foregoing description I have set forth my invention in the particular detailed form which I prefer to adopt but it will be understood that the details may be variously changed and modified within the skill of the mechanic, without departing from the limits of my invention; and it will be further understood that the invention is not limited to any particular form or construction of the parts except in so far as such limitations are specified in the claims.

Having thus described my invention, what I claim is:

1. In a wheel, the combination of a rim, hub, and connected spokes, the said rim comprising two annular sections disposed edgewise and provided on their adjacent edges with outwardly extending annular flanges connected together to form an anti-skid member.

2. In a wheel, the combination of a rim, hub, and connected spokes, the said rim comprising two annular sections disposed edgewise and provided on their adjacent edges with outwardly extending annular flanges connected together to form an anti-skid member, and provided at their outer edges with inwardly extending annular flanges to stiffen the rim.

3. A wheel rim comprising two annular sections provided each with edge flanges extending respectively outwardly and inwardly, said sections being disposed edgewise with the outwardly extending flanges connected flatly together to form an anti-skid member.

In testimony whereof, I have affixed my signature hereto.

JOSEPH L. HECHT.